United States Patent [19]

Biermans

[11] 4,163,648
[45] Aug. 7, 1979

[54] PROCESS FOR SEPARATION OF AMMONIA AND CARBON DIOXIDE

[75] Inventor: Andreas J. Biermans, Urmond, Netherlands

[73] Assignee: Stamicarbon, B.V., Geleen, Netherlands

[21] Appl. No.: 847,654

[22] Filed: Nov. 1, 1977

[30] Foreign Application Priority Data

Nov. 3, 1976 [NL] Netherlands ............... 7612163

[51] Int. Cl.$^2$ ............... B01D 53/14; B01D 19/00
[52] U.S. Cl. ............... 55/70; 55/48; 55/89
[58] Field of Search ............... 55/68, 70, 89, 48

[56] References Cited

U.S. PATENT DOCUMENTS

| | | | |
|---|---|---|---|
| 2,812,829 | 11/1957 | Marullo et al. | 55/70 X |
| 2,992,703 | 7/1961 | Vasan et al. | 55/70 X |
| 3,315,442 | 4/1967 | Yuan et al. | 55/70 |
| 3,972,693 | 8/1976 | Wiesner et al. | 55/70 X |
| 4,013,431 | 3/1977 | Berkel et al. | 55/70 |
| 4,060,591 | 11/1977 | Garber et al. | 55/70 X |

FOREIGN PATENT DOCUMENTS

| | | | |
|---|---|---|---|
| 916945 | 1/1963 | United Kingdom . | |
| 1129939 | 10/1968 | United Kingdom | 55/70 |
| 1240499 | 7/1971 | United Kingdom | 55/70 |

Primary Examiner—Robert H. Spitzer
Attorney, Agent, or Firm—Cushman, Darby & Cushman

[57] ABSTRACT

An improved process for the separate recovery of substantially pure ammonia and substantially pure carbon dioxide from mixtures containing ammonia and carbon dioxide, and possibly water, such as are obtained as by-products in the manufacture of melamine from urea or the synthesis of urea from ammonia and carbon dioxide. The by-product mixture is introduced into a process loop having an ammonia separation zone, a carbon dioxide separation zone and a desorption zone, the zone to which the mixture is initially fed being dependent upon its composition. An ammonia off-gas, substantially free of carbon dioxide and water, is obtained from the ammonia separation zone, and the residual liquid phase is introduced into the carbon dioxide separation zone. Diluting water is also added to the carbon dioxide separation zone in an amount of from about 0.2 to 6 times, by weight, the combined total weight of the residual liquid phase from the ammonia separation zone and the by-product mixture, if any, fed into the carbon dioxide separation zone. A carbon dioxide off-gas, substantially free of ammonia and water, is obtained from the carbon dioxide separation zone and the residual liquid phase therefrom is introduced into the desorption zone wherein substantially all of the ammonia and carbon dioxide are desorbed and separated from the liquid phase and introduced into the ammonia separation zone.

24 Claims, 4 Drawing Figures

PROCESS FOR SEPARATION OF AMMONIA AND CARBON DIOXIDE

BACKGROUND OF THE INVENTION

The invention relates to a process for separating substantially pure ammonia and substantially pure carbon dioxide from mixtures containing ammonia, carbon dioxide and, possibly, water.

In some chemical processes mixtures containing ammonia and carbon dioxide, and sometimes also containing water, are obtained as by-products. For instance, in the synthesis of melamine from urea, a gas mixture is obtained which, in addition to melamine, also contains ammonia and carbon dioxide in amounts of at least 1.7 tons per ton of melamine. In order to effectively utilize this ammonia and carbon dioxide after separating it from the melamine, for example as recycle to a urea synthesis process, it is in most cases necessary to raise the gases to a higher pressure. Compression of the mixture requires special measures to prevent the condensation of ammonia and carbon dioxide and the deposition of solid ammonium carbamate thereby formed.

For this reason, the gas mixture is usually absorbed in water or in an aqueous solution, which results in the formation of an ammonium carbamate solution which can be pumped to the urea synthesis reactor, sometimes being concentrated by desorption and repeated absorption at a higher pressure. A disadvantage of this procedure is that the water, recycled to the urea reactor together with the ammonia and carbon dioxide, has an unfavorable effect on the urea synthesis reaction.

It has been proposed to separately remove the ammonia and carbon dioxide from the by-product mixtures, and to separately recycle them in order to avoid the formation and deposition of ammonium carbamate. However, the binary system of ammonia and carbon dioxide forms a maximum boiling azeotrope at a molar ammonia-to-carbon dioxide ratio of about 2:1, and therefore cannot be separated by simple distillation. This phenomenon also occurs in the ternary system of ammonia, carbon dioxide and water, and the term azeotrope as used herein should be understood to include this phenomenon in the ternary system as well. Also as used herein, with respect to such binary or ternary mixtures, the term "rich" with respect to ammonia shall be understood to mean that the mixture contains a greater percentage of ammonia than would an azeotropic mixture under the same conditions. Conversely, the term "lean" with respect to ammonia, as used herein, means that the mixture contains a percentage of ammonia the same as or less than the percentage of ammonia in an azeotropic mixture under the same conditions.

Various methods have been proposed to get around this azeotrope while still avoiding the necessity of recycling water together with the ammonia recycled to a urea synthesis process, all of which entail the separation of the ammonia-carbon dioxide mixtures into their constituents.

Some of these processes are based on selective absorption of either the ammonia or the carbon dioxide in a liquid. The Netherlands Patent Application No. 143,063, for example, describes a process in which ammonia is absorbed in an aqueous solution of an ammonium salt of a strong acid, such as ammonium nitrate, at an elevated pressure. Selective absorption of carbon dioxide by washing a gas mixture with an aqueous alkanolamine solution, such as monoethanolamine is disclosed in German Patent Specification No. 669,314. However, all of these processes have the drawback that the absorbed component must thereafter be removed from the absorbent and purified.

It has further been proposed to separate ammonia and carbon dioxide from mixtures of ammonia, carbon dioxide and water by distilling off most of the ammonia in a first step followed by distilling off the carbon dioxide in a second step carried out at a higher system pressure. The term "system pressure" as used herein means the sum of the partial pressures of ammonia, carbon dioxide and water. Processes of this kind are described in U.S. Pat. No. 3,112,177, and in the British Pat. No. 1,129,939.

U.S. Pat. No. 3,112,177 describes a process in which in a first step carried out at a system pressure of between 1 and 5 atmospheres absolute, carbon dioxide gas is separated from a mixture of ammonia, carbon dioxide and water, which mixture is lean with respect to ammonia. The remaining liquid is then stripped with, for instance, methane at an overall pressure of 1 atmosphere absolute. This results in a lowering of the system pressure and in the escape of ammonia and some carbon dioxide, so that a mixture of methane, ammonia and carbon dioxide with an overall pressure of 1 atmosphere absolute is obtained. In order to remove traces of carbon dioxide contained in the gas mixture, part of the mixture is condensed, which causes the carbon dioxide to be absorbed by the liquid ammonia.

A similar process is described in British Pat. No. 1,129,939. According to this disclosure, a gas mixture consisting of ammonia and carbon dioxide, rich with respect to ammonia, is absorbed in water or an aqueous solution. Ammonia is distilled from the resulting aqueous solution at atmospheric pressure. The remainder of the solution is then subjected to fractional distillation at a pressure of between 5 and 20 atmospherees absolute with heating in order remove the carbon dioxide.

These two processes are based on the principle that changing the pressure of a system of ammonia, carbon dioxide and water makes it possible to separate out ammonia at the lower pressure and carbon dioxide at the higher pressure. The ratio between the system pressure in the ammonia removal and the system pressure in the carbon dioxide removal must, in both processes, be between about 1:5 and 1:20, if the separation is to proceed smoothly.

However, these processes have the drawback that if the mixture to be treated is available at a pressure of more than 1 atmosphere, it first has to be expanded to 1 atmosphere. Gaseous ammonia is then released having a maximum pressure of 1 atmosphere, or lower, in the event a large amount of another gas is present. If this ammonia is to be subjected to further processing, such as in a urea synthesis process, it has to be raised to a higher pressure. The compression energy required for this is quite substantial. Furthermore, the carbon dioxide concentration in the ammonia has to be kept extremely low to prevent formation and deposition of solid ammonium carbamate in the compressor and high pressure lines.

Another possibility is to liquefy the gaseous ammonia by deep cooling and thereafter raise the liquid ammonia to the required pressure by pumping. However, this also requires the consumption of a substantial amount of energy.

SUMMARY OF THE INVENTION

The present invention provides a simple and less costly process for separating substantially pure ammonia and substantially pure carbon dioxide from mixtures containing ammonia and carbon dioxide, and possibly water, utilizing simple ammonia and carbon dioxide separation apparatus.

It has been found, surprisingly, that it is possible to recover ammonia and carbon dioxide separately from such mixtures without the problems outlined above if the ammonia and carbon dioxide containing feed supplied to a carbon dioxide separation zone is diluted by the addition of water in an amount of between 0.2 and 6 times, by weight, the total weight of such ammonia and carbon dioxide containing feed.

According to one embodiment of the invention, ammonia substantially free of carbon dioxide and water is first separated from a mixture of ammonia, carbon dioxide and possibly water, rich with respect to ammonia, in an ammonia separation zone. From the residual liquid phase leaving the bottom of this ammonia separation zone, carbon dioxide is separated in the carbon dioxide separation zone, wherein the residual liquid phase from the ammonia separation zone fed to the carbon dioxide separation zone, is diluted with between 0.2 and 6 times its weight of water.

According to another embodiment of the invention, carbon dioxide substantially free of ammonia and water, is first separated in a carbon dioxide separation zone from a mixture of ammonia, carbon dioxide and possibly water, which mixture is lean with respect to ammonia. From the bottom of this carbon dioxide separation zone, the residual liquid phase is fed to a desorption zone wherein virtually all ammonia and carbon dioxide are desorbed and the resulting gas phase is introduced into the ammonia separation zone. Ammonia, substantially free of carbon dioxide and water, is recovered from this resulting gas phase in the ammonia separation zone, and the resulting liquid phase is supplied to the carbon dioxide separation zone. Diluting water is added to this carbon dioxide rectification zone in an amount of between 0.2 to 6 times, by weight, the combined total weight of the initial mixture to be separated, plus the residual liquid phase from the ammonia separation zone fed into the carbon dioxide separation zone.

According to another embodiment of the invention, where the ammonia and carbon dioxide containing mixture to be separated also contains a substantial quantity of water, it may be advantageous to feed this mixture initially to the desorption zone wherein the ammonia and carbon dioxide are desorbed, and, together with some water vapor, are introduced into the ammonia separation zone. Ammonia, substantially free of carbon dioxide and water vapor, is obtained from the top of the ammonia separation zone, and the residual liquid phase, containing ammonia, carbon dioxide and water, is introduced into the carbon dioxide separation zone. Diluting water is also introduced into the carbon dioxide separation zone in an amount of between about 0.2 to 6 times, by weight, the total quantity of the residual liquid phase from the ammonia separation zone fed into the carbon dioxide separation zone. Carbon dioxide, substantially free of ammonia and water, is obtained from the top of the carbon dioxide separation zone, and the residual liquid phase from the bottom of the carbon dioxide separation zone is fed to the desorption zone.

The amount of water contained in the mixture to be separated, above which it may be advantageous to feed it initially to the desorption zone, depends on a number of factors. If the mixture is lean with respect to ammonia, it is most efficient to feed it initially to the carbon dioxide separation zone regardless of its water content. If the mixture is rich with respect to ammonia, whether it is initially fed to the desorption zone or the ammonia separation zone, depends upon a balancing of energy consumptions, which in turn is, in part, dependent upon the water content and the system pressure. For example, at a system pressure of 18 atmospheres absolute, the water content above which it would be advantageous to feed the mixture initially into the desorption zone lies between 70 and 80% by weight.

It can be seen that the choice to which separation step the mixture to be separated is initially fed depends upon the composition of this mixture. Thus, it it is rich with respect to ammonia, that is, having ammonia to carbon dioxide ratio higher than the azeotrope, then it is most advantageously fed to the ammonia separation step. On the other hand, if it is lean with respect to ammonia, that is having an ammonia to carbon dioxide ratio the same as or lower than the azeotrope, then it is most advantageously fed initially to the carbon dioxide separation step. Finally, if the mixture to be separated is rich with respect to ammonia and also contains a substantial quantity of water, it may be most advantageous to feed it initially to the desorption step.

The ammonia and carbon dioxide zones may consist of any type of apparatus suitable for separating the gaseous and liquid components in accordance with the invention including, but not limited to, rectification, distillation and washing columns.

By preference, the ammonia separation zone is operated at a bottom temperature of between about $+60°$ to a$170°$ C. and a top temperature of between about $-35°$ to $+66°$ C., and the carbon dioxide separation zone is operated at a bottom temperature of between about $+75°$ to $+200°$ C. and a top temperature of between about $0°$ to $+100°$ C.

The appropriate bottom temperature in the ammonia separation step depends on the composition of the feed to this step, and on the pressure. However, if a temperature below $+60°$ C. is applied, either a temperature range is reached where solid reaction products of ammonia, carbon dioxide and, if present, water are formed, or the feed to the carbon dioxide separation step will have such a composition that this step does not proceed optimally. In most cases, the bottom temperature in the ammonia separation zone should not be higher than $+170°$ C., in order to keep it, and the temperature in the carbon dioxide separation zone, which is always slightly higher, below the temperature above which unacceptable corrosion takes place.

For the same reason, the bottom temperature in the carbon dioxide separation zone preferably should not be higher than $+200°$ C.

The top temperature of the ammonia separation zone is determined mainly by the pressure applied. The top temperature in the carbon dioxide separation zone is determinative of the eventual purity of the carbon dioxide, that is, of its ammonia content. In general, ammonia contents of 100 ppm or lower are easily obtained with top temperatures up to 100° C.

The temperatures in the tops of the two separation zones may be determined, respectively, by the quantity of ammonia reflux and by the quantity and temperature of the diluting and washing water used.

The system pressure in the carbon dioxide separation is preferably not higher than twice the system pressure in the ammonia separation. More preferably, the system pressure in the two separations should be substantially equal.

Pressure ratios higher than 2 can quite well be used, but this will result in a lowering of the pressure at which the ammonia is released, requiring a higher capital investment for the liquefaction of the ammonia. Additionally, this will cause the energy consumption to become unduly high. For these reasons, it is preferred not to go beyond the pressure ratios mentioned above.

A process according to the invention can also be carried out with equal system pressures in the ammonia separation and the carbon dioxide separation zones, having the advantage of simplicity. Using pressure ratios differing by a comparatively small amount may also be advantageous, for instance in relation to the heat economy of the ammonia and carbon dioxide recovery and to the size of the heat transmitting area required.

In general, the absolute value of the system pressure at which the separation is carried out is determined by the pressure at which the recovered ammonia is to be used. Mostly, system pressures of between 1 and 50 atmospheres absolute are chosen. It is, notably, advantageous to work at system pressures at which the gaseous ammonia can be liquefied by means of cooling water, so that this ammonia can be pumped and no costly compression step is needed. Preference is given to a system pressure of between about 5 and 25 atmospheres absolute in the ammonia separation, more preferably a pressure of between 15 and 22 atmospheres absolute.

The amount of diluting water to be added to the carbon dioxide separation zone depends upon the combined total weight of the residual liquid phase from the ammonia separation zone fed to the carbon dioxide separation, together with the mixture to be separated if fed initially to the carbon dioxide separation zone. The ratio of diluting water to this combined feed should be within the range of between about 0.2:1 and 6:1 by weight. However, the separation has its optimum efficiency if this ratio is between about 0.5:1 and 2.5:1. Between the values of 0.2 and 0.5, the separation becomes more and more difficult to carry out, with the result that even larger quantities of material will have to be separated, so that too much energy is needed for the separation.

Above the value of 2.5, the same effect is noticed and, furthermore, the temperature at which carbon dioxide can be separated out becomes higher, which is less desirable in view of the corrosion hazard.

The correct choice of the amount of water used for dilution fully depends, within the limits set, on the actual operating conditions. Considerations might be, for instance, integration with another equipment unit, or the availability of inexpensive waste heat. It is not necessary to use pure water for this dilution. Water containing small amounts of ammonia, urea, etc., may also be used as diluent.

It should be noted that in the process according to the abovementioned British Pat. No. 1,129,939, some water is added in the fractionated distillation in which the carbon dioxide is released. In that process, the carbon dioxide is washed with water to remove the last traces of ammonia resulting in the formation of a solution of ammonia in water, which solution is supplied to the fractional distillation in which the carbon dioxide is released. The quantities of water used in this process are only small, and, at any rate, are too small to bring about the result obtained by means of the process according to the present invention.

Mixtures of ammonia and carbon dioxide which are to be separated by this process may be in the form of an aqueous solution, although this is not necessary. It is also possible to separate gaseous mixture of ammonia, carbon dioxide and water by means of the invention, and to separate fully water-free gaseous mixtures of ammonia and carbon dioxide.

It will be recognized that the invention can be applied advantageously to the separation of ammonia and carbon dioxide from by-product mixtures containing ammonia and carbon dioxide resulting from a number of processes including, but not limited to, the manufacture of melamine from urea, the synthesis of urea from ammonia and carbon dioxide, compound urea-ammonia processes, and the preparation of cyanuric acid. Preferably, such mixtures to be separated should contain, by weight, at least 0,5% advantageously at least 2,5% ammonia and at least 0,5%, advantageously at least 2,5% carbon dioxide and no more than 1% of any other volatizable component except for water.

DESCRIPTION OF PREFERRED EMBODIMENTS

Figure 1:
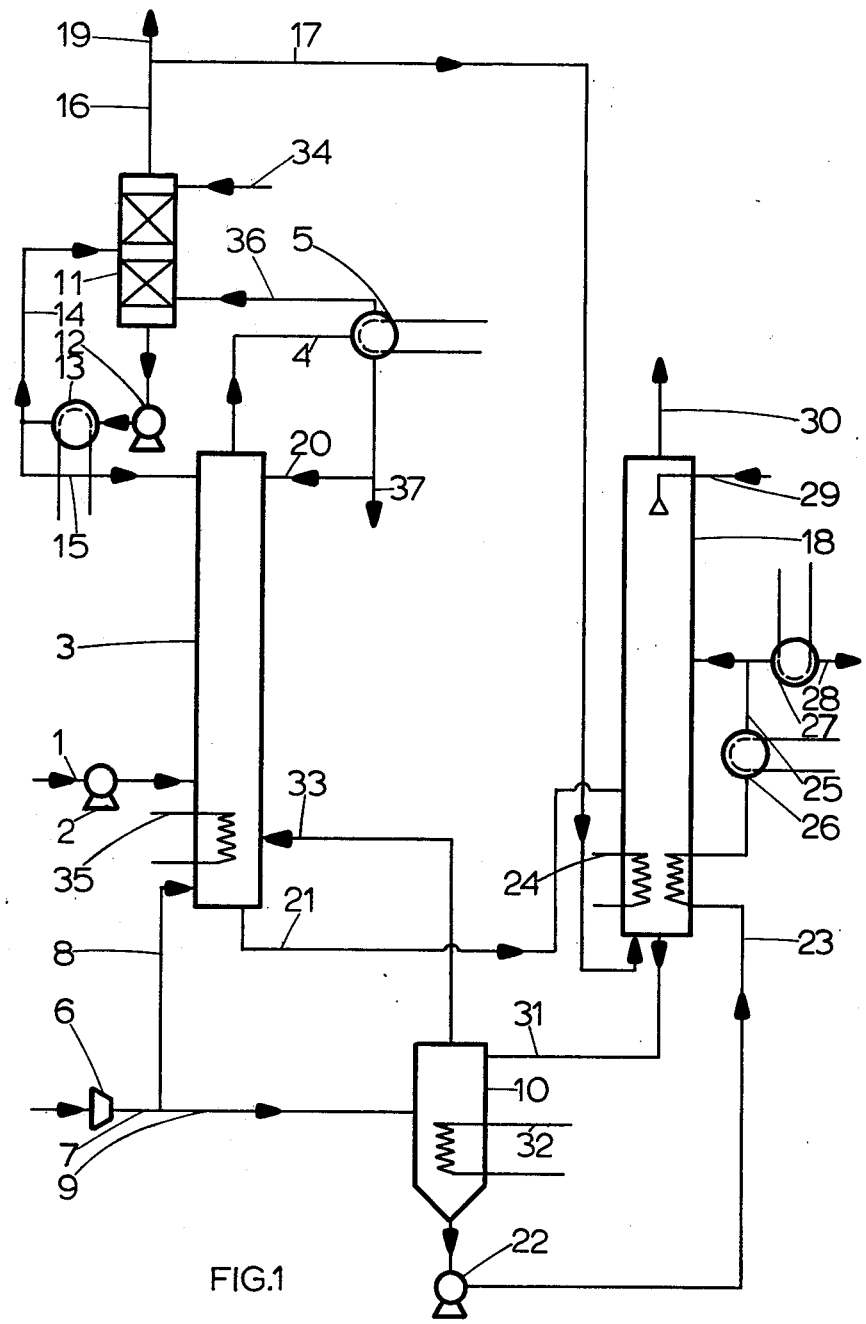
FIG. 1 illustrates the embodiments of the invention wherein the ammonia and carbon dioxide containing mixture is initially fed into the ammonia separation zone.

The process of the invention will be described in detail with reference to FIGS. 1 and 2 wherein the mixture to be separated is initially fed to the ammonia separation zone.

The mixture to be separated, containing ammonia, carbon dioxide and water, is fed through line 1 and pump 2 into the ammonia separation zone 3, here illustrated as a rectifying column. At the top of column 3, ammonia is discharged through line 4. In condenser 5, this ammonia is condensed by cooling. An uncondensed gas mixture, composed of ammonia and inerts, leaves this condenser. The origin of the inert gases is the passivation air supplied to the equipment in order to keep the construction materials of the vessels and lines passivated so as to prevent unacceptable corrosion. Instead of air, it is, of course, possible to use for this purpose oxygen or a substance evolving oxygen. Part of the air is illustrated as being fed via compressor 6 and lines 7 and 8 to ammonia separation column 3, and part is fed through line 9 to desorber 10.

The gas leaving condenser 5 is stripped of ammonia in washing column 11 by a washing with water supplied through line 34. The resulting aqueous solution is discharged from washing column 11 by means of pump 12 and passed through recirculation cooler 13 to remove the heat of absorption. A part of the cooled aqueous solution is returned to washer 11 through line 14. The remainder of the solution is returned to the ammonia rectification column through line 15, after having been reduced in pressure should this be necessary.

The inert gas is discharged through line 16 and fed via line 17 to the bottom of the carbon dioxide separation zone 18, here illustrated as a rectification column. If desired, the inerts may also be vented in whole or in part through line 19.

A portion of the ammonia liquified in condenser 5 is returned through line 20 to the ammonia rectification column as reflux. The heat needed for that rectification is supplied to the bottom of this column by steam coil 35.

From the bottom of the ammonia rectification column 3, the residual liquid phase containing ammonia, carbon dioxide and water is discharged through line 21 and fed into the carbon dioxide rectification column 18, which operates at substantially the same pressure as the ammonia rectification column 3. Through pump 22 and line 23, the residual liquid phase from the bottom of desorber 10 is fed into column 18 as a diluent. So as to improve the heat distribution, this liquid phase first gives off part of its heat in the bottom of the carbon dioxide rectification column 18 and in cooler 26. The balance of the heat needed for the rectification in column 18 is supplied through heating coils 24, e.g., in the form of steam. A portion of the liquid flow in line 23 is sent through line 25, cooled with water in cooler 27 and discharged through line 28.

Through line 29, a flow of washing water is supplied to carbon dioxide rectification column 18 to remove, as much as possible, the ammonia from the carbon dioxide. Carbon dioxide leaves the top of column 18 through line 30, possibly containing some inerts, but containing substantially no ammonia.

The residual liquid phase from the bottom of carbon dioxide rectification column 18, being a dilute solution of ammonia and carbon dioxide and water, is passed through line 31 and into desorber 10, wherein nearly all of the ammonia and carbon dioxide is expelled by heating with, for instance, steam supplied through heating coils 32.

The residual liquid phase in the bottom of the desorption column, now stripped of nearly all the ammonia and carbon dioxide, is passed through line 23 and fed, in part, to carbon dioxide rectification column 18. The gas mixture of ammonia, carbon dioxide and water, formed in desorber 10 is passed through line 33 into the ammonia rectification column 3.

Figure 2:
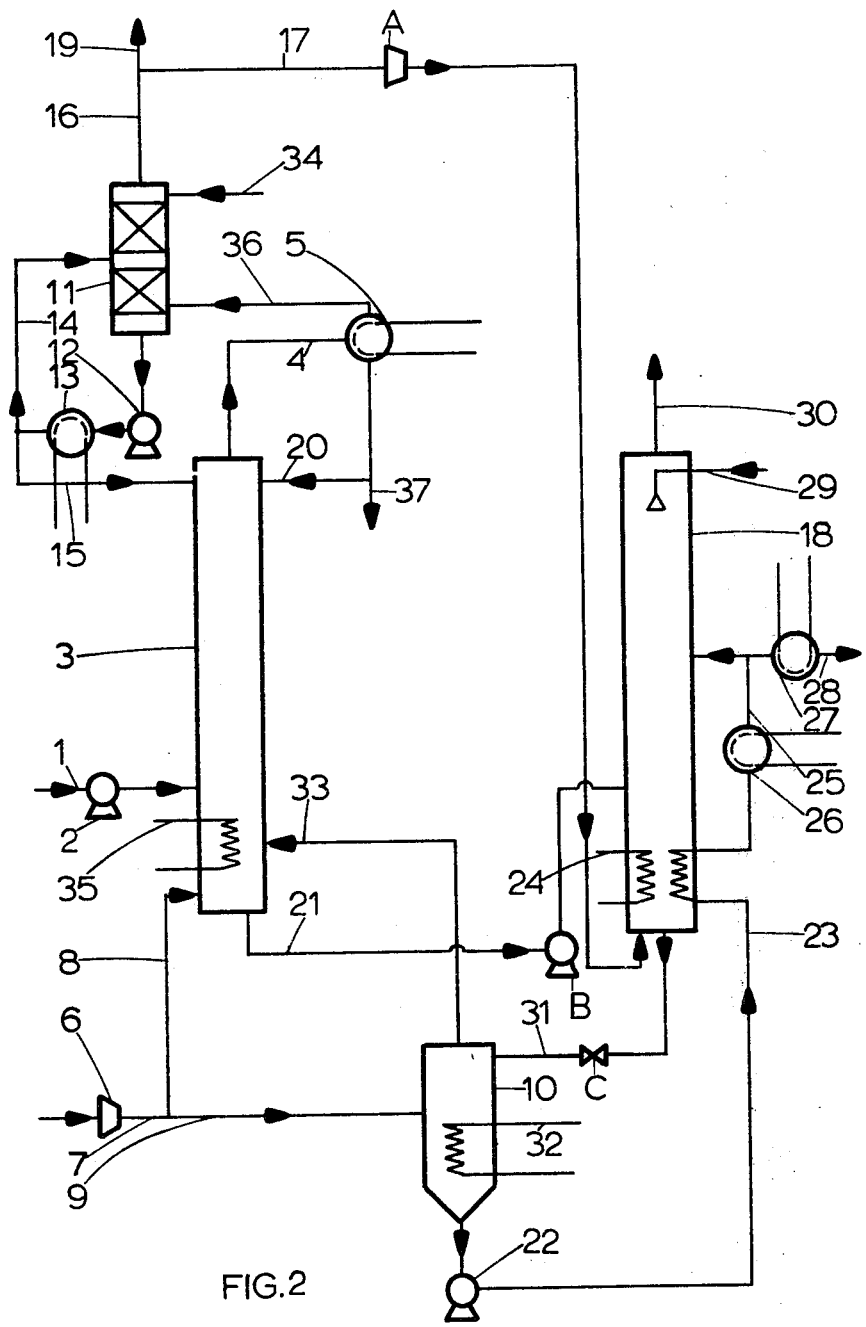
FIG. 2 illustrates a variation of the embodiment of FIG. 1, wherein the carbon dioxide separation zone is operated at a higher pressure than the desorption and ammonia separation zones.

FIG. 2 illustrates a variation of the embodiment illustrated in FIG. 1 wherein the carbon dioxide separation zone is operated at a system pressure higher than the system pressure of the ammonia separation zone. FIG. 2 is essentially the same as FIG. 1, except that a compressor A and a pump B are installed in lines 17 and 21, respectively, to raise the pressure of the gas and liquid flows. Furthermore, line 31 now contains a reducing valve C, which reduces the pressure of the bottoms from the carbon dioxide rectification column 18. Desorption column 10 is here operated at a system pressure that is virtually equal to the system pressure in the ammonia rectification column. However, it is also possible to carry out the desorption at the same system pressure as the carbon dioxide rectification.

Figure 3:
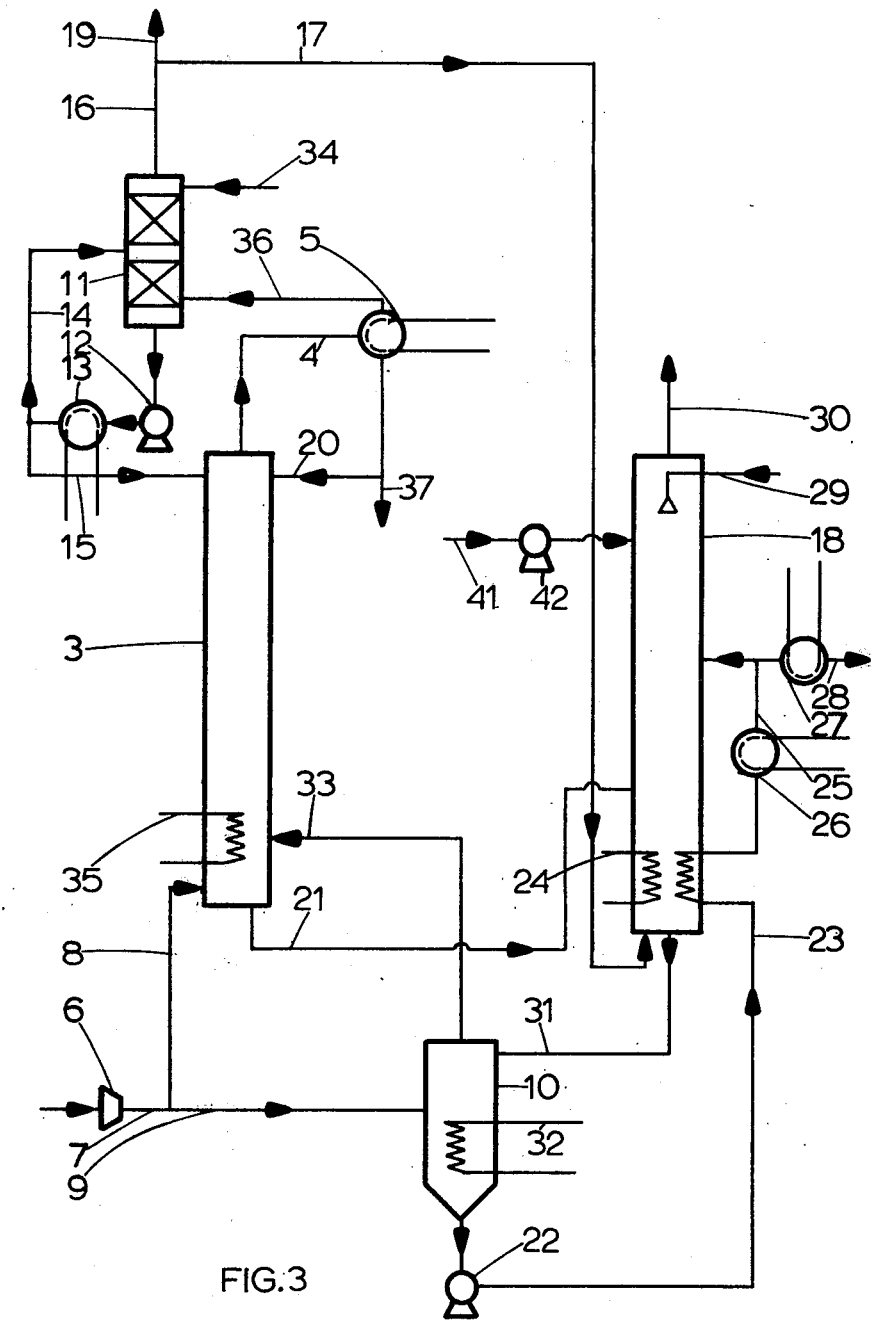
FIG. 3 illustrates the embodiment of the invention wherein the ammonia and carbon dioxide containing mixture is initially fed into the carbon dioxide separation zone.

FIG. 3 illustrates an embodiment of the invention wherein the initial feed mixture containing $NH_3$ and $CO_2$ the composition of which is lean in $NH_3$, is fed into $CO_2$ separation zone 18 through line 41 and pump 42. Except for the location of the initial feed the embodiment of FIG. 3 is essentially the same as that of FIG. 1.

Figure 4:
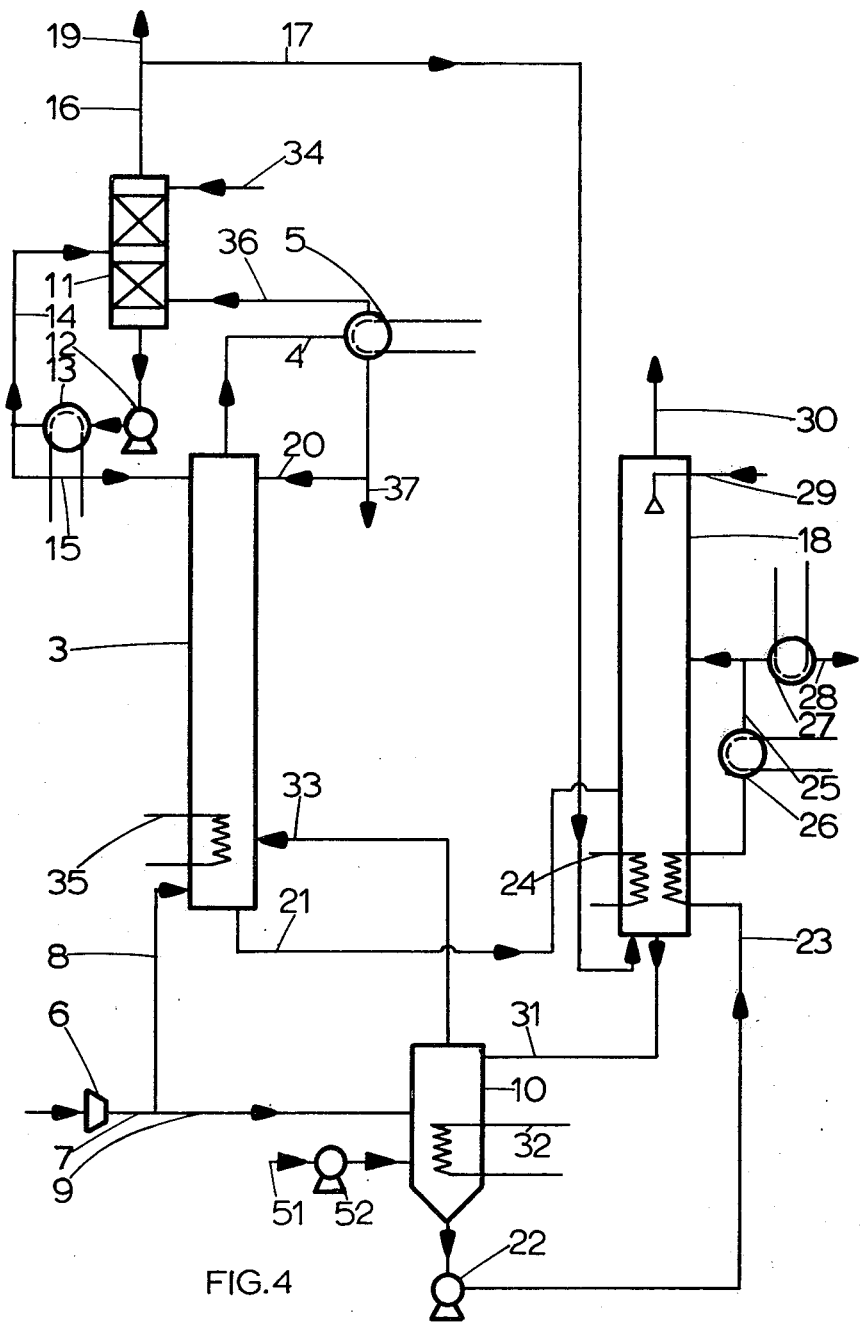
FIG. 4 illustrates the embodiment of the invention wherein the ammonia and carbon dioxide containing mixture is fed initially into the desorption zone.

FIG. 4 illustrates an embodiment of the invention wherein the initial feed mixture in the form of a diluted solution of $NH_3$ and $CO_2$ in water is fed into desorber 10 through line 51 and pump 52. Except for the location of the initial feed, the embodiment of FIG. 4 is essentially the same as that of FIG. 1.

EXAMPLE 1

In the equipment as shown in FIG. 1, substantially pure ammonia and substantially pure carbon dioxide were separated from a mixture of ammonia, carbon dioxide and water. The reference numerals given herein refer to FIG. 1, and all percentages are percentages by weight.

At a system pressure of 18 atmospheres absolute, and a temperature of 73° C., an aqueous solution of ammonia and carbon dioxide containing 33.4% ammonia, 18.2% carbon dioxide and 48.4% water is fed into the bottom of ammonia rectification column 3 at a rate of 51,972 kg/h. via compressor 6, 635 kg/h. of air is supplied, of which 248 kg/h. is sent to ammonia rectification column 3 and 387 kg/h. to desorber 10.

A gas mixture consisting of 50.4% ammonia, 17.7% carbon dioxide, 30.9% water and 1% inerts, and having a temperature of 162° C., coming from desorber 10 is also fed into the ammonia rectification column at a rate of 39,304 kg/h. At the top of this column, a gas mixture consisting of 99.4% ammonia and 0.6% inerts is discharged at a rate of 65,217 kg/h. By means of cooling water, part of this gas mixture if liquified in condenser 5. A reflux flow of 44,630 kg/h. of the liquified mixture is returned to column 3. A gas mixture consisting of 88.9% ammonia and 11.1% inserts leaves condenser 5 at the rate of 3,474 kg/h. This is washed in washer 11 with 4,496 kg/h. of water. Via recirculation cooler 13, heat is removed from washer 11. A solution consisting of 38.7% ammonia and 61.3% water is recycled to the ammonia rectification column at a rate of 7,335 kg/h. The temperature at the top of the ammonia rectification column is 46° C. Through lines 15 and 16 inert gas is sent to the carbon dioxide rectification column 18 at a rate of 635 kg/h.

From the bottom of ammonia rectification column 3, a residual liquid phase consisting of 25.4% ammonia, 21.0% carbon dioxide and 53.6% water, and having a temperature of 131° C., is sent through line 21 to carbon dioxide rectification column 18 at a rate of 78,027 kg/h.

Carbon dioxide rectification column 18, also operating at a pressure of 18 atmospheres absolute, receives through line 25 a flow of 73,290 kg/h. of diluent, consisting of water with traces of ammonia and carbon dioxide, which liquid when leaving the desorber, has a temperature of 206° C. The liquid gives off part of its heat in the bottom of the carbon dioxide rectification column 18, residual heat being removed in cooler 26.

The residual liquid phase leaves desorber 10 at a rate of 108,909 kg/h., which means that 35,610 kg/h. of water is discharged, whether or not with cooling in cooler 27. This water may be used, for instance, to absorb ammonia and carbon dioxide.

The top of the carbon dioxide rectification column 18 receives washing water at a rate of 5,959 kg/h. for washing out the last traces of ammonia. By means of steam, the bottom temperature in the carbon dioxide rectification column 18 is maintained at 158° C. The temperature in the top of this column is 35° C. A gas mixture consisting of 93.7% carbon dioxide and 6.3% inerts, and containing less than 100 ppm of ammonia leaves this column at the rate of 10,094 kg/h.

From the bottom of carbon dioxide rectification column 18, a solution consisting of 81.9% water, 13.4% ammonia and 4.7% carbon dioxide, and having a temperature of 158° C., is sent to desorber 10 in an amount of 147,826 kg/h.

By means of steam, this solution is virtually stripped of all ammonia and carbon dioxide in desorber 10 so that water containing only traces of ammonia and carbon dioxide is discharged in an amount of 108,909 kg/h. The temperature at the top of the desorber 10 is 161.8° C.

EXAMPLE 2

In the equipment as shown in FIG. 2, substantially pure ammonia and substantially pure carbon dioxide were separated from the mixture of ammonia, carbon dioxide and water. The reference numerals herein refer to FIG. 1a, and percentages given are percentages by weight.

At a system pressure of 18 atmospheres absolute and a temperature of 73° C., an aqueous solution of ammonia and carbon dioxide having a composition of 33.4% ammonia, 18.2% carbon dioxide, and 48.4% water, is fed at the rate of 51,972 kg/hr. into the bottom of ammonia rectification column 3. Air is supplied via compressor 6 at a rate of 635 kg/h., of which flow 248 kg/h. goes to ammonia rectification column 3 and 387 kg/h. to desorber 10.

The ammonia rectification column 3 further receives 37,943 kg/h. of a gas mixture consisting of 49.1% ammonia, 15.5% carbon dioxide, 34.4% water and 1.0% inerts, and having a temperature of 158° C., which mixture comes from desorber 10. At the top of this ammonia rectification column 3, a gas mixture containing 99.0% ammonia and 1% inerts is discharged at a rate of 60,888 kg/h. By deep cooling, part of this gas mixture is liquified in condenser 5. A flow of 40,056 kg/h. of this liquified mixture is sent to column 3 as reflux. A gas mixture consisting of 81.7% ammonia and 18.3% inerts leaves condenser 5 at the rate of 3,474 kg/h. This gas mixture is washed in washer 11 with 5,003 kg/h. of water. Heat is removed from washer 11 via recirculation cooler 13. A solution containing 36.2% ammonia and 63.8% water is returned to the ammonia rectification column at a rate of 7,842 kg/h. The temperature in the top of this column is 39° C.

Through lines 16 and 17 and compressor A, a flow of 635 kg/h. of inert gases sent to carbon dioxide rectification column 18, which operates at a system pressure of 25 atmospheres absolute.

Through line 21 and pump B, a flow of 77,172 kg/h. of a liquid having a composition of 24.1% ammonia, 19.9% carbon dioxide and 56.0% water, and having a temperature of 128° C., is passed to the carbon dioxide rectification column 18.

This carbon dioxide rectification column 18 is operated at a pressure of 25 atmospheres absolute, and receives through line 25 a flow of 48,915 kg/h. of diluent, consisting of water with traces of ammonia and carbon dioxide, which liquid, when leaving desorber 10, has a temperature of 197° C. The liquid gives off part of its heat in the bottom of carbon dioxide rectification column 18, residual heat being removed in cooler 26.

The liquid leaves the desorber at the rate of 85,031 kg/h., which means that 36,116 kg/h. of water is discharged, whether or not with cooling in cooler 27, which water may be used, for instance, to absorb ammonia and carbon dioxide.

The top of carbon dioxide rectification column 18 receives washing water at the rate of 5,959 kg/h. for washing out the last traces of ammonia as much as possible. By means of steam, the bottom temperature in carbon dioxide rectification column 18 is maintained at 170° C. The temperature in the top of this column is 35° C. A gas mixture consisting of 93.7% carbon dioxide and 6.3% inerts, and containing less than 100 ppm of ammonia leaves the top of the column at the rate of 10,094 kg/h.

From the bottom of column 18 a solution consisting of 80% water, 15.2% ammonia and 4.8% carbon dioxide, and having a temperature of 170° C., is passed to desorber 10 after having been reduced in pressure by reducing valve C.

By means of steam, the solution is virtually stripped of ammonia and carbon dioxide in the desorber, so that water containing only traces of ammonia and carbon dioxide can be discharged at the rate of 85,031 kg/h. The temperature in the top of the desorber is 158° C.

EXAMPLE 3

In the equipment as shown in FIG. 3 substantially pure $NH_3$ and substantially pure $CO_2$ were separated from a aqueous solution of $NH_3$ and $CO_2$, which had a composition on the $CO_2$-rich side of the azeotrope. At a system pressure of 18 atmospheres absolute and a temperature of 130° C., an aqueous solution of $NH_3$ and $CO_2$ of the composition 20% $NH_3$, 20% $CO_2$ and 60% water, was fed into $CO_2$-rectification column (18) at the rate of 50,000 kg/hour.

From the bottom of $NH_3$-rectification column (3) a liquid consisting of 26.0% of $NH_3$, 22.1% of $CO_2$ and 51.9% of $H_2O$ and having a temperature of 130° C. was sent through line (21) to $CO_2$-rectification column (18) at the rate of 27,405 kg/hour.

This column (18), received through line (25), a flow of 54,990 kg/hour of diluent, consisting of water with traces of $NH_3$ and $CO_2$, which liquid, when leaving the desorber (10) had a temperature of 206° C. The liquid gave off part of its heat in the bottom of $CO_2$-rectification column (18), residual heat being removed in cooler (26).

Liquid leaves desorber (10) at the rate of 95,278 kg/hour, which meant that 40,288 kg/hour of water was discharged, possibly with cooling in cooler (27). This water could be used for instance to absorb $NH_3$ and $CO_2$.

The top of the $CO_2$-rectification column received washing water at the rate of 6347 kg/hour for washing out the last traces of $NH_3$. By means of steam, the bottom temperature in $CO_2$-rectification column (18) was maintained at 160° C. The temperature in the top was 35° C. A gas mixture consisting of 94.6% of $CO_2$ and 5.9% of other gases and containing less than 100 ppm of $NH_3$, left this column at the rate of 10,694 kg/hour.

From the bottom of column (18) a solution consisting of 82.0% of $H_2O$, 13.3% of $NH_3$ and 4.7% of $H_2O$ and having a temperature of 160° C., was sent to desorber (10) at a rate of 128,683 kg/hour.

By means of steam, the solution was substantially stripped of $NH_3$ and $CO_2$ in the desorber, so that water containing only traces of $NH_3$ and $CO_2$ was discharged at a rate of 95,278 kg/hour. The temperature in the top of the desorber was 161.8° C. Through compressor (6) 635 kg/hour of air was supplied, of which 248 kg/hour was sent to $NH_3$-rectification column (3) and 387 kg/hour to desorber (10).

A gas mixture consisting of 50.7% of $NH_3$, 17.9% of $CO_2$, 30.4% of $H_2O$ and up to 1.0% of other gases which came from the desorber (10) was fed into the $NH_3$-rectification column, at the rate of 33,405 kg/hour. At the top of this column a gas mixture consisting of 99.0% of $NH_3$ and 1.0% of other gases was discharged at the rate of 62,360 kg/hour. By means of cooling water, part of this gas mixture was liquefied in condenser (5). A reflux flow of 49,071 kg/hour of the liquefied mixture was sent to column (3). A gas mixture consisting of 80.7% $NH_3$ and 19.2% of other gases left condenser (5) at the rate of 3289 kg/hour. This was washed in washer (11) with 4000 kg/hour of water. Heat was removed from washer (11) in circulation cooler (13). A solution consisting of 39.9% of $NH_3$ and 60.1% of $H_2O$ was recycled to the $NH_3$-rectification column at the rate of 6654 kg/hour. The temperature in the top of this column was 50° C. Through lines (15) and (16) other gases are sent to $CO_2$ rectification column (18) at the rate of 635 kg/hour.

EXAMPLE 4

In the equipment as shown in FIG. 4 substantially pure $NH_3$ and substantially pure $CO_2$ were separated from a dilute aqueous solution thereof, at a system pressure of 18 atmospheres absolute.

At a rate of 50,000 kg/hour, an aqueous solution of $NH_3$ and $CO_2$, having a composition of 82.0% $H_2O$, 4.7% $CO_2$ and 13.3% $NH_3$, was fed to desorber (10). From the bottom of column (18) a solution having approximately the same composition and having a temperature of 159.6° C., was sent to desorber (10) at a rate of 38,166 kg/hour.

By means of steam, the liquid in the desorber (10) was substantially stripped of $NH_3$ and $CO_2$ in the desorber, so that water containing only traces of $NH_3$ and $CO_2$ was discharged at a rate of 65,279 kg/hour. The temperature in the top of the desorber was 162° C. Through compressor (6) 635 kg/hour of air was supplied, of which 400 kg/hour was sent to $NH_3$-rectification column (3) and 235 kg/hour to desorber (10).

A gas mixture consisting of 50.7% of $NH_3$, 17.9% of $CO_2$, 30.4% of $H_2O$ and up to 1.0% of other gases which came from desorber (10), was fed into the $NH_3$-rectification column, at the rate of 23,522 kg/hour. At the top of this column a gas mixture consisting of 98.4% of $NH_3$ and 1.6% of other gases was discharged at the rate of 39,099 kg/hour.

By means of cooling water, part of this gas mixture was liquefied in condensor (5). A reflux flow of 29,160 kg/hour of the liquefied mixture was sent to column (3). A gas mixture consisting of 80.7% $NH_3$ and 19.3% of other gases left condenser (5) at the rate of 3,289 kg/hour. This was washed in washer (11) with 4,000 kg/hour of water. Heat was removed from washer (11) in circulation cooler (13). A solution consisting of 39.9% of $NH_3$ and 60.1% of $H_2O$ was recycled to the $NH_3$-rectification column at the rate of 6654 kg/hour. The temperature in the top of this column was 50.6° C. Through lines (15) and (16) other gases were sent to $CO_2$-rectification column (18) at the rate of 635 kg/hour.

From the bottom of $NH_3$-rectification column (3) a liquid consisting of 25.1% of $NH_3$, 20.5% of $CO_2$ and 54.4% of $H_2O$ and having a temperature of 132° C. was sent through line (21) to $CO_2$-rectification column (18) at the rate of 20,237 kg/hour.

This column (18), received through line (25), a flow of 18,801 kg/hour of diluent, consisting of water with traces of $NH_3$ and $CO_2$, which liquid, when leaving the desorber (10), had a temperature of 206° C. The liquid gave off part of its heat in the bottom of $CO_2$-rectification column (18), residual heat being removed in cooler (26).

Liquid left desorber (10) at the rate of 65,279 kg/hour, which meant that 46,478 kg/hour of water was discharged, possibly with cooling in cooler (27). This water could be used for instance to absorb $NH_3$ and $CO_2$.

The top of the $CO_2$-rectification column received washing water at the rate of 1491 kg/hour for washing out the last traces of $NH_3$. By means of steam, the bottom temperature in $CO_2$-rectification column (18) was maintained at 159.6° C. The temperature in the top was 42° C. A gas mixture consisting of 80.4% of $CO_2$ and 19.6% of other gases and containing less than 100 ppm of $NH_3$, left this column at the rate of 2,995 kg/hour.

What is claimed is:

1. A process for the separate recovery of ammonia substantially free of carbon dioxide and water, and carbon dioxide substantially free of ammonia and water, from a mixture essentially containing ammonia and carbon dioxide, which mixture is rich with respect to ammonia, said process comprising the steps of:
   introducing said mixture into an ammonia separation zone and separately removing therefrom an ammonia off-gas substantially free of carbon dioxide and water, and a residual liquid phase containing ammonia, carbon dioxide and water;
   introducing said residual liquid phase from said ammonia separation zone into a carbon dioxide separation zone and separately removing therefrom a carbon dioxide off-gas substantially free of ammonia and water, and a residual liquid phase containing ammonia, carbon dioxide and water;
   introducing said residual liquid phase from said carbon dioxide separation zone into a desorption zone and separately removing therefrom a desortion zone off-gas containing ammonia, carbon dioxide and water vapor, and a liquid phase of desorption water substantially free of ammonia and carbon dioxide; and
   introducing said desorption zone off-gas into said ammonia separation zone;
wherein the system pressure in said carbon dioxide separation zone is no greater than twice the system pressure in said ammonia separation zone, and diluting water is introduced into said carbon dioxide separation zone in an amount of between 0.2 and 6 times, by weight, the total weight of said residual liquid phase from said ammonia separation zone introduced into said carbon dioxide separation zone.

2. The process of claim 1 wherein the ammonia separation zone is operated with a bottom temperature of between about +60° and +170° C., and a top temperature of between about −35° and +66° C., and the carbon dioxide separation zone is operated with a bottom temperature of between about +75° and +200° C. and a top temperature of between about 0° to +100° C.

3. The process of claim 1 wherein the carbon dioxide separation zone is operated at a system pressure which is substantially the same as the system pressure in the ammonia separation zone.

4. The process of claim 1 wherein diluting water is introduced into the carbon dioxide separation zone in an amount of between about 0.5 and 2.5 times, by weight, the total weight of said residual liquid phase from said ammonia separation zone introduced into said carbon dioxide separation zone.

5. The process of claim 1 where at least a portion of said liquid phase of desorption water substantially free of ammonia and carbon dioxide is introduced into said carbon dioxide separation zone as at least a portion of said diluting water.

6. The process of claim 1 wherein the ammonia separation zone and the carbon dioxide separation zone are operated at a system pressure of between about 1 and 50 atmospheres absolute.

7. The process of claim 6 wherein the ammonia separation zone is operated at a system pressure of between about 5 and 25 atmospheres absolute.

8. The process of claim 7 wherein the ammonia separation zone is operated at a system pressure of between about 15 and 22 atmospheres absolute.

9. A process for the separate recovery of ammonia substantially free of carbon dioxide and water, and carbon dioxide substantially free of ammonia and water, from a mixture essentially containing ammonia and carbon dioxide, which mixture is lean with respect to ammonia, said process comprising the steps of:
 introducing said mixture into a carbon dioxide separation zone and separately removing therefrom a carbon dioxide off-gas substantially free of ammonia and water, and a residual liquid phase containing ammonia, carbon dioxide and water;
 introducing said residual liquid phase from said carbon dioxide separation zone into a desorption zone and separately removing therefrom a desorption zone off-gass containing ammonia, carbon dioxide and water vapor, and a liquid phase of desorption water substantially free of ammonia and carbon dioxide;
 introducing said desorption zone off-gas into an ammonia separation zone and separately removing therefrom an ammonia off-gas substantially free of carbon dioxide and water, and a residual liquid phase containing ammonia, carbon dioxide and water; and
 introducing said residual liquid phase from said ammonia separation zone into said carbon dioxide separation zone,
wherein the system pressure in said carbon dioxide separation zone is no greater than twice the system pressure in said ammonia separation zone, and diluting water is introduced into said carbon dioxide separation zone in an amount of between 0.2 and 6 times, by weight, the combined total weight of said mixture and said residual liquid phase from said ammonia separation zone introduced into said carbon dioxide separation zone.

10. The process of claim 9 wherein the ammonia separation zone is operated with a bottom temperature of between about +60° and +170° C., and a top temperature of between about −35° and +66° C., and the carbon dioxide separation zone is operated with a bottom temperature of between about +75° and +200° C. and a top temperature of between about 0° to +100° c.

11. The process of claim 9 wherein the carbon dioxide separation zone is operated at a system pressure which is substantially the same as the system pressure in the ammonia separation zone.

12. The process of claim 9 wherein diluting water is introduced into the carbon dioxide separation zone in an amount of between about 0.5 and 2.5 times, by weight, the combined total weight of said residual liquid phase from said ammonia separation zone introduced into said carbon dioxide separation zone, together with the total weight of said mixture initially introduced into said carbon dioxide separation zone.

13. The process of claim 9 where at least a portion of said liquid phase of desorption water substantially free of ammonia and carbon dioxide is introduced into said carbon dioxide separation zone as at least a portion of said diluting water.

14. The process of claim 9 wherein the ammonia separation zone and the carbon dioxide separation zone are operated at a system pressure of between about 1 and 50 atmospheres absolute.

15. The process of claim 14 wherein the ammonia separation zone is operated at a system pressure of between about 5 and 25 atmospheres absolute.

16. The process of claim 15 wherein the ammonia separation zone is operated at a system pressure of between about 15 and 22 atmospheres absolute.

17. A process for the separate recovery of ammonia substantially free of carbon dioxide and water, and carbon dioxide substantially free of ammonia and water, from a mixture essentially containing ammonia and carbon dioxide, which mixture is rich with respect to ammonia and additionally contains a substantial amount of water, said process comprising the steps of:
 introducing said mixture into a desorption zone and separately removing therefrom a desorption zone off-gas containing ammonia, carbon dioxide and water vapor, and liquid phase of desorption water substantially free of ammonia and carbon dioxide;
 introducing said desorption zone off-gas into an ammonia separation zone and separately removing therefrom an ammonia off-gas substantially free of carbon dioxide and water, and a residual liquid phase containing ammonia, carbon dioxide and water;
 introducing said residual liquid phase from said ammonia separation zone into a carbon dioxide separation zone and separately removing therefrom a carbon dioxide off-gas substantially free of ammonia and water and a residual liquid phase containing ammonia, carbon dioxide and water;
 introducing said residual liquid phase from said carbon dioxide separation zone into said desorption zone;
wherein the system pressure in said carbon dioxide separation zone is no greater than twice the system pressure in said ammonia separation zone, and diluting water is introduced into said carbon dioxide separation zone in an amount of between about 0.2 and 6 times, by weight, the total weight of said residual liquid phase from said ammonia separation zone introduced into said carbon dioxide separation zone.

18. The process of claim 17 wherein the ammonia separation zone is operated with a bottom temperature of between about +60° and +170° C., and a top temperature of between about −35° and +66° C., and the carbon dioxide separation zone is operated with a bottom temperature of between about +75° and +200° C. and a top temperature of between about 0° to +100° C.

19. The process of claim 17 wherein the carbon dioxide separation zone is operated at a system pressure which is substantially the same as the system pressure in the ammonia separation zone.

20. The process of claim 17 wherein diluting water is introduced into the carbon dioxide separation zone in an amount of between about 0.5 and 2.5 times, by weight, the total weight of said residual liquid phase from said ammonia separation zone introduced into said carbon dioxide separation zone.

21. The process of claim 17 where at least a portion of said liquid phase of desorption water substantially free of ammonia and carbon dioxide is introduced into said carbon dioxide separation zone as at least a portion of said diluting water.

22. The process of claim 17 wherein the ammonia separation zone and the carbon dioxide separation zone are operated at a system pressure of between about 1 and 50 atmospheres absolute.

23. The process of claim 22 wherein the ammonia separation zone is operated at a system pressure of between about 5 and 25 atmospheres absolute.

24. The process of claim 23 wherein the ammonia separation zone is operated at a system pressure of between about 15 and 22 atmospheres absolute.

* * * * *